United States Patent
Aoi et al.

(10) Patent No.: US 7,100,426 B2
(45) Date of Patent: Sep. 5, 2006

(54) KNOCKING SENSOR

(75) Inventors: Katsuki Aoi, Kani (JP); Tomohiro Hirata, Komaki (JP); Takashi Maeda, Kakamigahara (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 11/035,059

(22) Filed: Jan. 14, 2005

(65) Prior Publication Data

US 2005/0155412 A1   Jul. 21, 2005

(30) Foreign Application Priority Data

Jan. 15, 2004  (JP)  ............ P.2004-008555
Nov. 26, 2004  (JP)  ............ P.2004-343079

(51) Int. Cl.
*G01L 23/22*  (2006.01)

(52) U.S. Cl. .......... 73/35.07; 73/35.01; 73/35.12; 73/35.13

(58) Field of Classification Search ......... 73/35.07, 73/35.12, 35.13
See application file for complete search history.

(56) References Cited

U.S. PATENT DOCUMENTS

| | | | |
|---|---|---|---|
| 5,939,616 A * | 8/1999 | Ito et al. ............... | 73/35.11 |
| 6,212,940 B1 | 4/2001 | Castaing et al. | |
| 6,739,182 B1 * | 5/2004 | Mueller et al. ......... | 73/35.11 |
| 6,752,005 B1 * | 6/2004 | Harada et al. ......... | 73/35.13 |
| 6,779,381 B1 * | 8/2004 | Subramanian et al. ... | 73/35.07 |
| 6,786,078 B1 * | 9/2004 | Brammer .............. | 73/35.11 |
| 6,923,041 B1 * | 8/2005 | Harada et al. ......... | 73/35.07 |
| 2003/0005911 A1 * | 1/2003 | Subramanian et al. .. | 123/406.29 |
| 2003/0121312 A1 * | 7/2003 | Harada et al. ......... | 73/35.07 |
| 2005/0229678 A1 * | 10/2005 | Shibata et al. ........ | 73/35.11 |

FOREIGN PATENT DOCUMENTS

| JP | 11-173907 A | 7/1999 |
|---|---|---|
| JP | 2002-257624 A | 9/2002 |

* cited by examiner

*Primary Examiner*—Edward Lefkowitz
*Assistant Examiner*—Freddie Kirkland, III
(74) *Attorney, Agent, or Firm*—Sughrue Mion, PLLC

(57) ABSTRACT

A knocking sensor comprises: a cylindrical body including a cylindrical portion and a supporting flange provided at an outer circumference of a lower end of the cylindrical portion; parts including an insulating member, an electrode plate and an annular piezoelectric element; and a fixing member including a tubular portion which comprises a holding portion protruding from an outer circumference of the tubular portion and is formed to insert into the cylindrical portion from an upper end of the cylindrical portion, the holding portion being elastically deformable to hold the parts, wherein the fixing member is fixed in the cylindrical portion by inserting the tubular portion into the cylindrical portion from the upper end of the cylindrical portion and wherein the parts are clamped and fixed between the supporting flange and the holding portion by holding the parts elastically with the holding portion, while the fixing member is fixed in the cylindrical portion.

23 Claims, 13 Drawing Sheets

FIG. 1
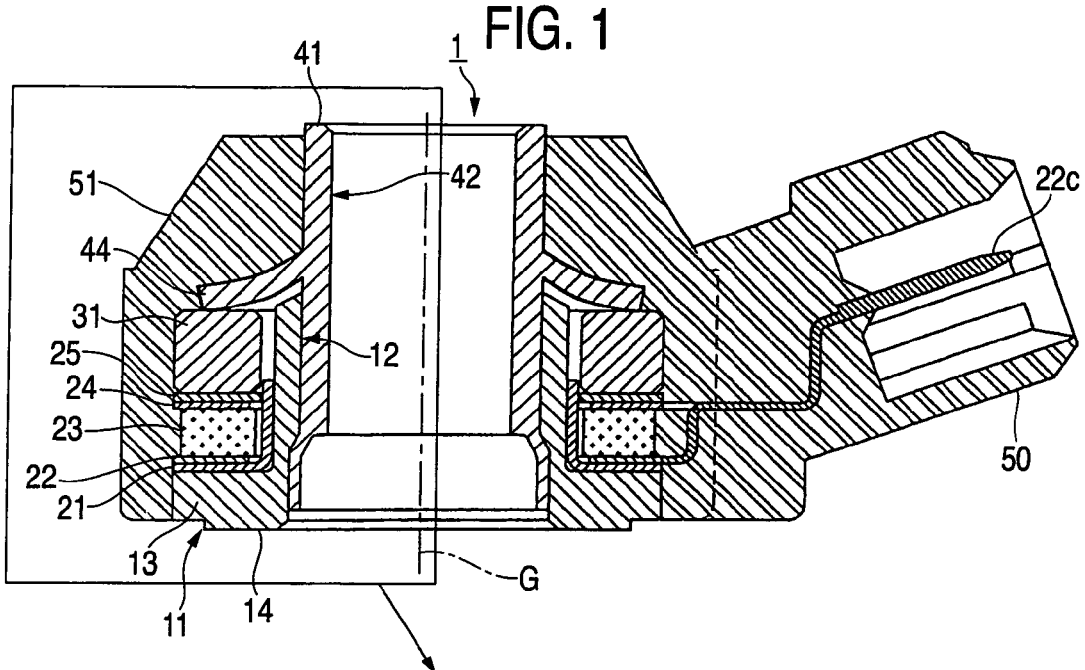
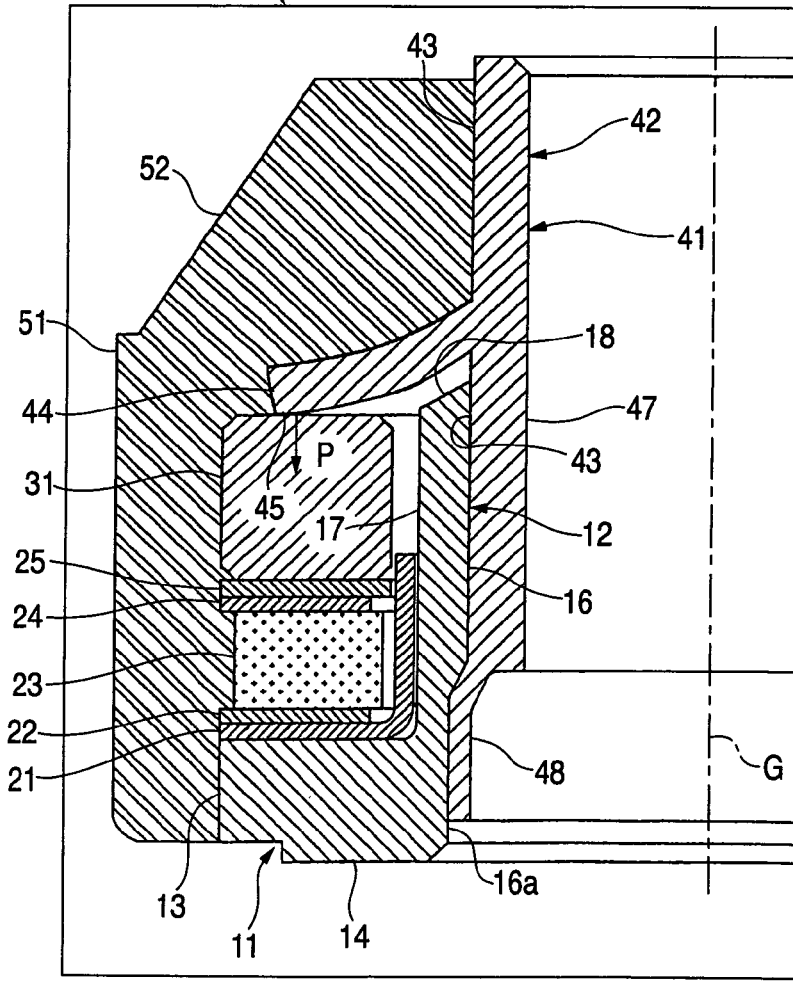

FIG. 12
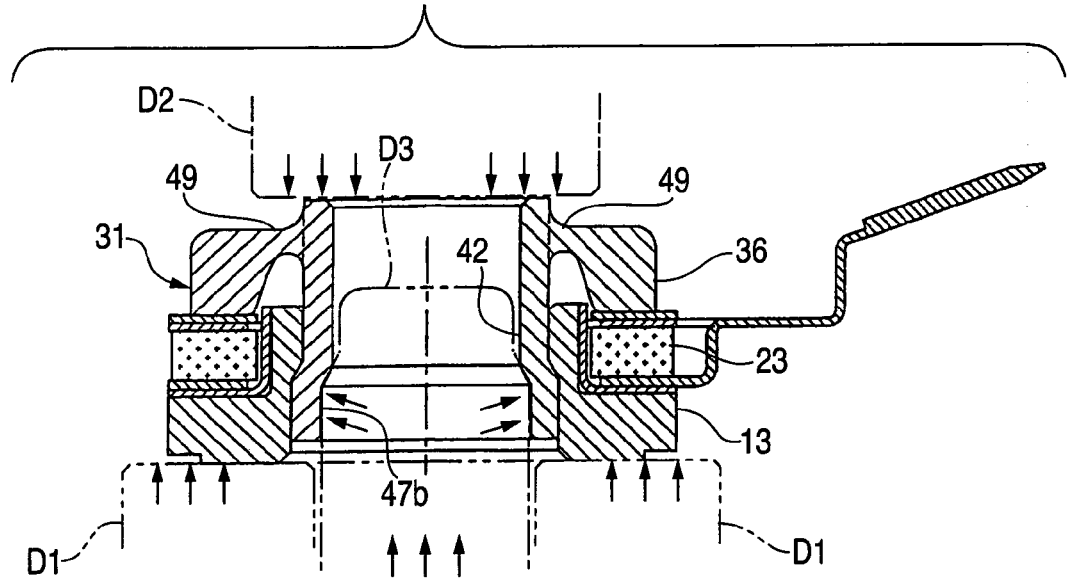
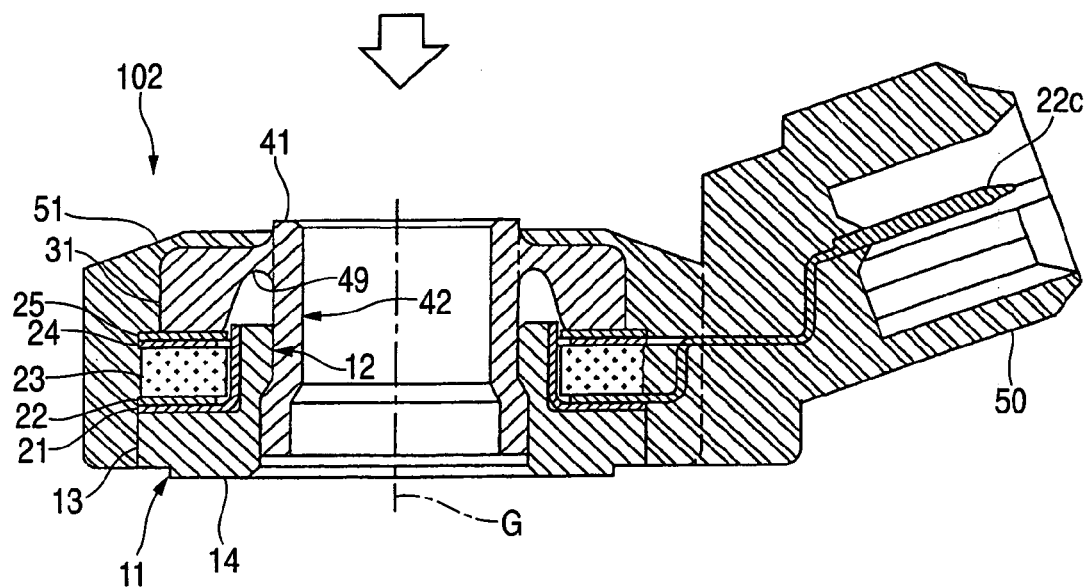

KNOCKING SENSOR

BACKGROUND OF THE INVENTION

1. Field of the Invention

The present invention relates to a knocking sensor and, more particularly, to a non-resonance type knocking sensor for detecting a knocking of an internal combustion engine.

2. Description of the Related Art

The following structures are known as example of such a knocking sensor (as will be shortly referred to as the "sensor"). In one structure (of JP-A-2002-257624): an insulating member, an electrode plate, an annular piezoelectric element, an electrode plate and an insulating member are arranged sequentially in the recited order on a supporting flange, which is formed at the outer circumference of the lower end of a cylindrical portion of a cylindrical body; a ring-shaped weight (or a weight) is arranged on the upper insulating member; and the piezoelectric element is clamped on the supporting flange. In this structure, a vibrating load according to a knocking vibration is applied to the piezoelectric element by the weight so that the piezoelectric element may generate a voltage signal according to the knocking vibration. The signal voltage is extracted from connection terminals wired to and connected with the electrode plates on the two faces of the piezoelectric element thereby to detecting a knocking so that an ignition timing or the like is controlled to suppress the occurrence of the knocking.

In this knocking sensor, the means widely adopted for clamping to fix the piezoelectric element together with the individual members is a fixing structure using a nut, in which a washer (or a disc spring) having spring properties is arranged on a weight so that the piezoelectric element is fastened by screwing a screw member such as the nut into threaded portion formed in the outer circumference of the cylindrical portion. There is also a knocking sensor, which has fixing means other than that screw type.

Specifically, the knocking sensor (of JP-A-11-173907) is provided with: a case worked from a metal plate to have a vertical inner circumference wall, a horizontal bottom wall and a vertical outer circumference wall concentric to the inner circumference wall to define an annular housing portion having an open upper end; an annular piezoelectric element housed on the bottom portion of the housing portion; an annular weight arranged in the housing portion on the upper side of the piezoelectric element and fitted and fixed on the inner circumference wall of the case by pressing it into the case; and a resin filler filling the cavity of the housing portion. This knocking sensor is made to have the structure, in which the annular weight is pressed and fixed in and a long the inner wall of the housing portion of the case for housing the piezoelectric element and so on so that the piezoelectric element is held by that weight.

In the technique disclosed in JP-A-2002-257624, the means for pressing and fixing the piezoelectric element is exemplified by screwing the nut into the threaded portion formed in the outer circumference of the cylindrical portion. Therefore, it is possible to acquire the reliability in clamping (or pressing) and fixing the piezoelectric element. However, this structure may cause a situation, in which fine metal chips (e.g., fine strips or powder) may be generated between the nut and the threaded portion in the outer circumference of the cylindrical portion by the friction between them. The fine metal chips may stick to the electrodes of the piezoelectric element or the electrode plates in the case thereby to cause a short-circuiting drawback and to invite failures.

In the press-in structure of the weight described in JP-A-11-173907, on the other hand, the weight is pressed in along the inner circumference wall of the case, in which the piezoelectric element is housed and arranged. This structure increases the probability of such a danger more seriously than the aforementioned nut screwing case that the fine metal chips (i.e., the metallic fine strips or powder making the case or weight) are formed by the friction (or wear) action or the scraping action between the weight and the inner circumference wall at the press-in time. Specifically, those metal chips highly probably intrude into the case in the press-in procedure. The chips stick to the electrodes of the piezoelectric element or the electrode plates in the case thereby to cause a serious problem that the short-circuiting drawback is invited to raise the probability of danger of failures.

SUMMARY OF THE INVENTION

The present invention has an object to eliminate those problems in the sensors of the prior art and to provide a sensor having the danger of causing the short-circuiting drawback or the like.

In order to solve the problems thus far described, according to the first aspect of the invention, there is provided a knocking sensor comprising: a cylindrical body including a cylindrical portion and a supporting flange, the supporting flange being provided at an outer circumference of a lower end of the cylindrical portion; parts including an insulating member, an electrode plate and an annular piezoelectric element arranged and fixed on the supporting flange; and a fixing member including a tubular portion which comprises a holding portion protruding from an outer circumference of the tubular portion and is formed to insert into the cylindrical portion from an upper end of the cylindrical portion, the holding portion being elastically deformable to hold the parts, wherein the fixing member is fixed in the cylindrical portion by inserting the tubular portion of the fixing member into the cylindrical portion from the upper end of the cylindrical portion, and wherein the parts are clamped and fixed between the supporting flange and the holding portion by holding the parts elastically with the holding portion, while the fixing member is fixed in the cylindrical portion.

According to second aspect of the invention, there is provided a knocking sensor comprising: a cylindrical body including a cylindrical portion and a supporting flange, the supporting flange being provided at an outer circumference of a lower end of the cylindrical portion; parts including an insulating member, an electrode plate and an annular piezoelectric element arranged and fixed on the supporting flange; a weight arranged on the parts for clamping and fixing the parts between the supporting flange and the weight; and a fixing member including a tubular portion which comprises a holding portion protruding from an outer circumference of the tubular portion and is formed to insert into the cylindrical portion from an upper end of the cylindrical portion, the holding portion being elastically deformable to hold the weight, wherein the fixing member is fixed in the cylindrical portion by inserting the tubular portion of the fixing member into the cylindrical portion from the upper end of the cylindrical portion, and wherein the parts are clamped and fixed between the supporting flange and the weight by holding the weight elastically with the holding, while the fixing member is fixed in the cylindrical portion.

According to a third aspect of the invention, there is provided a knocking sensor as set forth in the first or second aspect of the invention, wherein the cylindrical portion comprises a diametrically enlarged portion at such a portion of its inner circumference as corresponds to a lower end portion of the tubular portion at the time when the tubular portion is inserted, and wherein the lower end portion of the tubular portion inserted is caulked and deformed to a diametrically larger shape and pushed onto an inner circumference of the diametrically enlarged portion, so as to fix the tubular portion in the cylindrical portion.

According to a fourth aspect of the invention, there is provided a knocking sensor as set forth in the first aspect of the invention, wherein the tubular portion is formed to press into the cylindrical portion, and the fixing member is fixed by pressing its tubular portion into the cylindrical portion from the upper end of the cylindrical portion.

According to a fifth aspect of the invention, there is provided a knocking sensor as set forth in the second aspect of the invention, wherein the tubular portion is formed to press into the cylindrical portion, and the fixing member is fixed by pressing its tubular portion into the cylindrical portion from the upper end of the cylindrical portion.

According to a sixth aspect of the invention, there is provided a knocking sensor as set forth in any of the first to fifth aspects of the invention, wherein the holding portion is formed into a ring shape at the outer circumference of the tubular portion.

According to a seventh aspect of the invention, there is provided a knocking sensor comprising: a cylindrical body including a cylindrical portion and a supporting flange, the supporting flange being provided at an outer circumference of a lower end of the cylindrical portion; parts including an insulating member, an electrode plate and an annular piezoelectric element arranged and fixed on the supporting flange; a weight arranged on the parts for clamping and fixing the parts between the supporting flange and the weight; and a fixing member including a tubular portion which is formed to insert into the cylindrical portion from an upper end of the cylindrical portion, wherein the weight is formed to protrude through an elastically deformable connecting portion from an outer circumference of the tubular portion, wherein the fixing member is fixed in the cylindrical portion by inserting the tubular portion of the fixing member into the cylindrical portion from the upper end of the cylindrical portion, and wherein the parts are clamped and fixed between the supporting flange and the weight by holding the parts elastically with a portion of the weight, while the fixing member is fixed in the cylindrical portion.

According to an eighth aspect of the invention, there is provided a knocking sensor as set forth in the seventh aspect of the invention, wherein the tubular portion is formed to press into the cylindrical portion from the upper end of the cylindrical portion, and wherein the fixing member is fixed by pressing the tubular portion of the fixing member into the cylindrical portion from the upper end of the cylindrical portion.

According to a ninth aspect of the invention, there is provided a knocking sensor as set forth in the seventh or eighth aspect of the invention, wherein the portion of the weight is formed into a ring shape at the outer circumference of the tubular portion.

According to a tenth aspect of the invention, there is provided a knocking sensor as set forth in any of the seventh to ninth aspects of the invention, wherein the elastically deformable connecting portion is made thinner than the portion of the weight.

According to an eleventh aspect of the invention, there is provided a knocking sensor as set forth in any of the fourth to sixth aspects and the eighth to tenth aspects of the invention, wherein the cylindrical portion comprises a diametrically enlarged portion at such a portion of its inner circumference as corresponds to a lower end portion of the tubular portion at the time when the tubular portion is pressed in, and wherein the lower end portion of the pressed-in tubular portion is caulked and deformed to a diametrically larger shape and pushed onto an inner circumference of the diametrically enlarged portion, so as to fix the tubular portion in the cylindrical portion.

According to a twelfth aspect of the invention, there is provided a knocking sensor as set forth in the seventh aspect of the invention, wherein the cylindrical portion comprises a diametrically enlarged portion at such a portion of its inner circumference as corresponds to a lower end portion of the tubular portion at the time when the tubular portion is inserted, and wherein the lower end portion of the tubular portion inserted is caulked and deformed to a diametrically larger shape and pushed onto an inner circumference of the diametrically enlarged portion.

According to a thirteenth aspect of the invention, there is provided a knocking sensor as set forth in any of the first, second and seventh aspects of the invention, wherein the fixing member comprises a thread in the outer circumference of the tubular portion, so as to fasten the fixing member into the cylindrical portion by a screwing manner.

BRIEF DESCRIPTION OF THE DRAWINGS

FIG. 1 presents a sectional front elevation and an enlarged view showing an embodiment of a knocking sensor of the invention;

FIG. 3 is a sectional view before the fixing member is pressed in;

FIG. 5 is a sectional view for explaining a caulking step after the fixing member was pressed in;

FIG. 12 presents sectional views showing other examples of the portion of a weight of the fixing member and a connector portion;

DETAILED DESCRIPTION OF THE INVENTION

Figure 2:
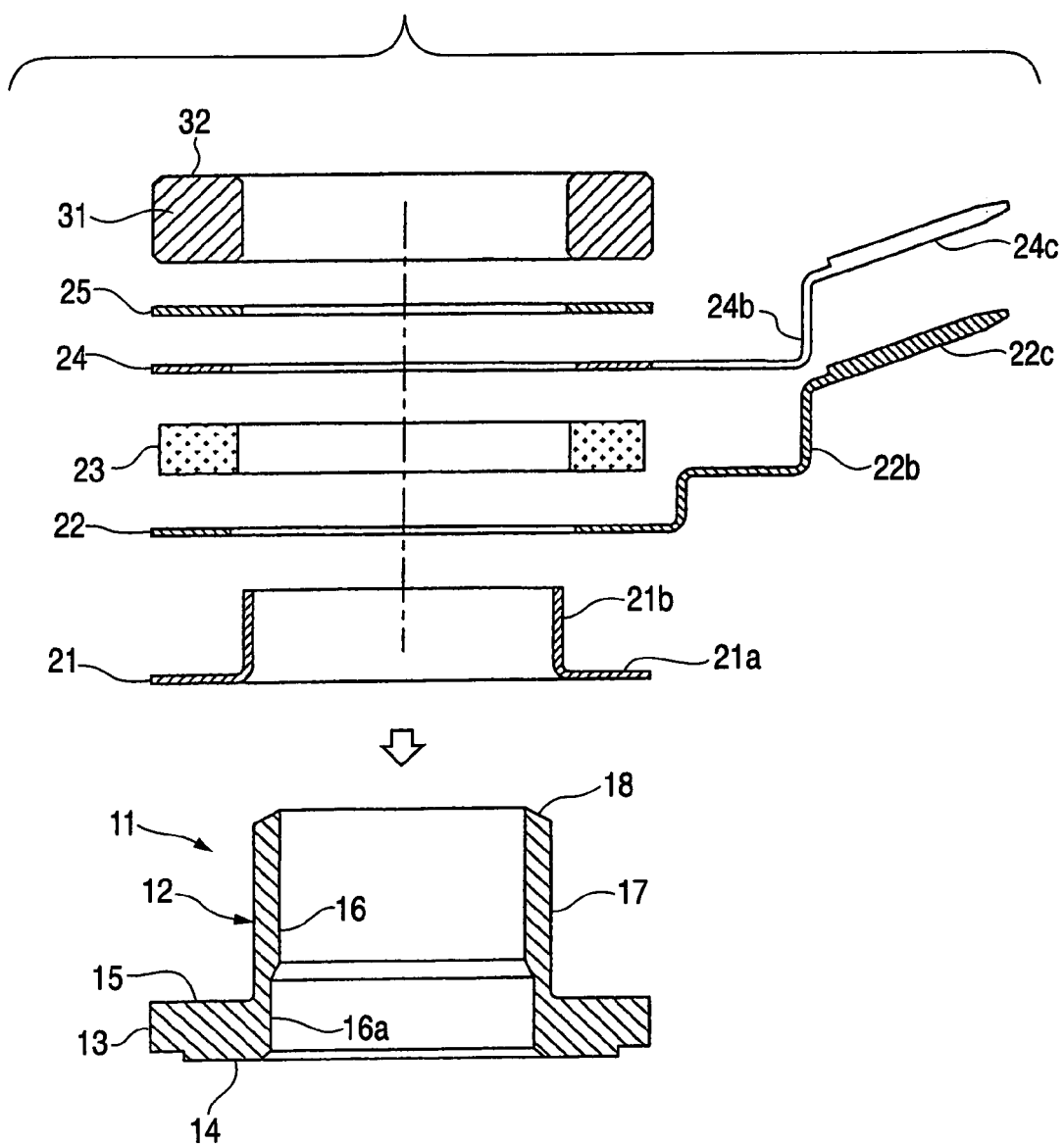
FIG. 2 is an exploded sectional view for explaining the individual parts excepting a fixing member.

An embodiment of the invention will be described in detail with reference to FIG. 1 to FIG. 5. In these figures, reference numeral 1 designates a knocking sensor of this embodiment, which is formed such that a piezoelectric element 23 or the like having an annular shape of a predetermined thickness is fitted on a cylindrical body (or an inner case) 11 made of a metal and erected upright, as specified in the following. The cylindrical body 11 is integrally formed to include a cylindrical portion 12 having an equal external diameter (in a straight shape), and a circular supporting flange 13 bulging concentrically from the outer circumference of the lower end of the cylindrical portion 12. Of these, the supporting flange 13 has its lower face 14 protruding slightly downward at its portion close to an axis G for providing a flat seating face, where it is mounted on the engine, and its upper face 15 formed into a flat annular face for placing an insulating member or the like. Moreover, the cylindrical portion 12 has its inner circumference 16 formed to have a circular transverse face concentric to an outer circumference 17 and to be straight with different diameters at its upper and lower portions. Here, the inner circumference of the portion, which is positioned to extend from the lower face 14 to above the upper face 15 of the supporting flange 13, is slightly diametrically enlarged to form a diametrically enlarged portion 16a, which merges through a tapered portion into the inner circumference 16 positioned thereover and having a slightly smaller diameter. Moreover, the inside (or the bore) of the cylindrical portion 12 is formed to have a circular transverse section while including the diametrically enlarged portion 16a. Moreover, the upper end 18 of the cylindrical portion 12 is tapered to converge (upward). Here, the cylindrical body 11 thus constructed is made of iron in this embodiment.

The individual parts (as referred to FIG. 2) are so sequentially arranged on the upper face 15 of the supporting flange 13 as are fitted on the outer circumference 17 of the cylindrical portion 12 of that cylindrical body 11. Specifically, there are arranged sequentially upward in the recited order: an annular insulating member 21 having an L-shaped section of a predetermined thickness; one annular electrode plate 22 for signal extractions; the piezoelectric element 23 having electrode layers on its two upper and lower faces; the other annular electrode plate 24 for signal extractions; and an annular insulating member 25 having a predetermined thickness. On (the upper face of) the upper insulating member 25, moreover, there is arranged a weight 31, which is made of a metal (e.g., brass) to have a ring shape of a rectangular section. Here, the lower insulating member 21 just above the supporting flange 13 is arranged to have its corners confronting the corners between that flange 13 and the cylindrical portion 12 and is set to have an external diameter equal to that of the flange 13. Moreover, the bottom plate portion 21a and the inner circumference wall portion 21b of the lower insulating member 21 and the upper insulating member 25 define a shape to enclose the piezoelectric element 23 and the upper and lower electrode plates 22 and 24 excepting the outer circumference side, thereby to keep the insulation between the cylindrical body 11 and the weight 31. Here, the external diameters of the individual parts above the lower insulating member 21 are made substantially equal to or slightly smaller than that of the lower insulating member 21, and the internal diameters of the same individual parts are made slightly larger than the external diameter of the inner circumference wall portion 21b of the lower insulating member 21. With those individual parts being thus set on the cylindrical body 11, moreover, the upper face 32 of the weight 31 is set lower than the upper end 18 of the cylindrical portion 12.

Here, the lower electrode plate 22 is provided with a connector pin portion 22c, which extends obliquely upward through a stepwise folded intermediate wire portion 22b, and the upper electrode plate 24 is also provided with a connector pin portion 24c (as referred to FIG. 2), which extends obliquely upward through a bent intermediate wire portion 24b. Moreover, these electrode plates 22 and 24 are so arranged when set on the cylindrical body 11 that the connector pin portions 22c and 24c are parallel in a plan view to each other and flush with each other.

On the other hand, a fixing member 41 made of a metal (e.g., iron) is fixed (as referred to FIGS. 4A and 4B), by inserting it downward, with its tubular portion 42 being coaxial, in (i.e., on the inner circumference 16) the cylindrical portion 12 in the cylindrical body 11 having those parts thus set. In this embodiment, however, the insertion is performed by a press-in operation, although described in detail hereinafter. For this insertion, the external diameter of the tubular portion (as will also be called the "press-in tubular portion") 42 is set, before pressed in, larger by about 0.15 mm, for example, than the internal diameter of the inner circumference 16 above the diametrically enlarged portion 16a of the cylindrical portion 12 of the cylindrical body 11. Moreover, the external diameter of the tubular portion 42 is made equal over its vertical entirety. In this embodiment, however, the press-in tubular portion 42 is provided, on its outer circumference 43 slightly above its intermediate portion, with a holding portion 44 formed to protrude concentrically. While the tubular portion 42 being pressed in and fixed, the holding portion 44 holds the upper face 32 of the weight 31 at its lower portion 45 close to its outer circumference, downward by a predetermined compression force P. In this embodiment, however, the holding portion 44 is formed into such a ring-shaped flange as is linearly inclined before compressed to the lower position as it goes the farther to its outer circumference edge. In the fixing state, the holding portion 44 is so warped (or elastically deformed) upward as to hold the upper face 32 of the weight 31 downward at all times by its reaction. Here, the holding force on the weight 31 by the elastic deformation of the holding portion 44 is so set that an output according to the knocking vibration may be stably obtained from the piezoelectric element 23. In this embodiment, the holding portion 44 has its sectional shape and sizes set to be elastically deformed to such an extent that such proper holding force may be obtained after it was pressed in. Here in this embodiment, the holding portion 44 is pressed in to such a position that the lower face of its root may hold a predetermined clearance from the upper end 18 of the cylindrical portion 12 in the cylindrical body 11.

In this embodiment, moreover, the press-in tubular portion 42 is so formed straight as to have the equal external diameter above and below the holding portion 44, but is so slightly enlarged in the internal diameter of the portion of an inner circumference 47 close to the lower end, that is, close to leading end of the tubular portion 42, as to form a thin portion 48 which corresponds to a lower end portion of the tubular portion in this specification. The tubular portion 42 is so caulked, after pressed in, at its thin portion 48 that the thin portion 48 is pushed onto the diametrically enlarged portion 16a of the inner circumference 16 of the cylindrical portion 12 of the cylindrical body 11. Here, the press-in tubular portion 42 is so set that its lower end is positioned, when pressed in, slightly above the lower face 14 of the cylindrical body 11. Moreover, an insulating resin 52 (e.g., 66 nylon) for forming an outer surface (or an outer case) 51 is molded to cover the entirety of the outer circumference sides of those parts. At the same time, the insulating resin 52 molded forms a connector portion 50, which extends obliquely upward to enclose the connector pins 22c and 24c together with that outer surface 51. The sensor 1 of this embodiment thus constructed is fixed by seating the lower face (or the bottom face) 14 of the supporting flange 13 on the outer surface of an internal combustion engine (or shortly an engine) and by fastening bolts into the inner side (or the bore) of the press-in tubular portion 42.

Here will be described the effects of the sensor 1 of this embodiment. In the sensor 1, the fixing means for clamping the individual parts including the piezoelectric element 23 is not made to have the structure of the related art, in which the weight is held by fastening the nut on the threaded portion formed in the outer circumference of the cylindrical portion. On the other hand, the press-in tubular portion 42 in the fixing member 41 is pressed in the cylindrical portion 12 of the cylindrical body 11. Moreover, the holding portion 44 holds the weight 31. This structure eliminates a danger that fine metal chips generated by the friction or the like at the press-in time stick to the electrodes or electrode plates of the piezoelectric element.

Specifically, the pressure is applied not to the side (or the outer side), on which the piezoelectric element 23 is housed, but in the direction of the axis G. In this press-in procedure, the fine metal chips, which are generated by the friction and wear between the inner circumference 16 of the cylindrical portion 12 and the outer circumference 43 of the press-in tubular portion 42, are extruded to the outside. Therefore, this embodiment has such a special effect as can prevent a short-circuiting drawback from being caused by those fine metal chips.

Thus, according to the sensor 1 of this embodiment, it is possible to provide a highly reliable sensor, which does not have the short-circuiting drawback. Moreover, this embodiment does not need any nut so that it can reduce the number of parts. In this embodiment, moreover, the thin portion 48 (lower end portion) at the portion close to the lower end of the press-in tubular portion 42 is caulked, after the press-in operation, to a larger diameter so that it is pushed onto the diametrically enlarged portion 16a of the inner circumference 16 of the cylindrical portion 12. Therefore, the sensor retains a high fixing force and sealing properties.

Figure 3:
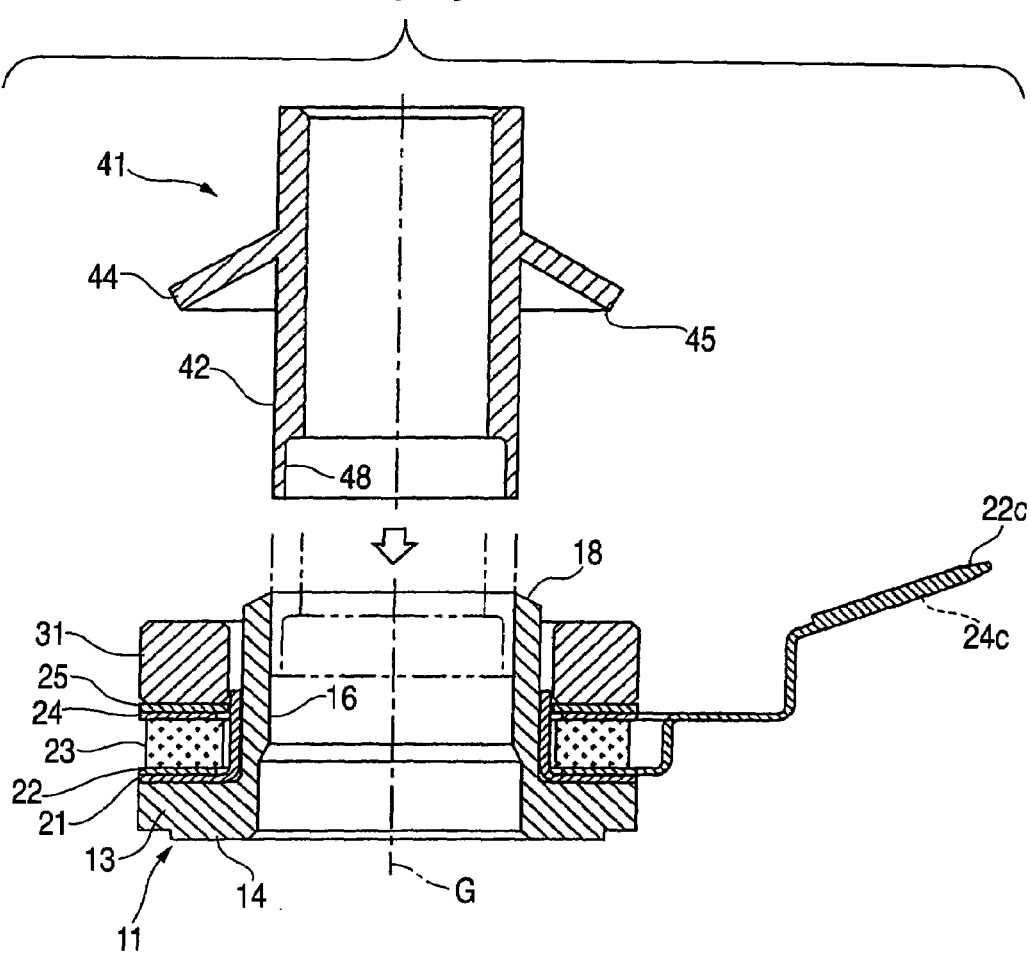
Figure 4A:
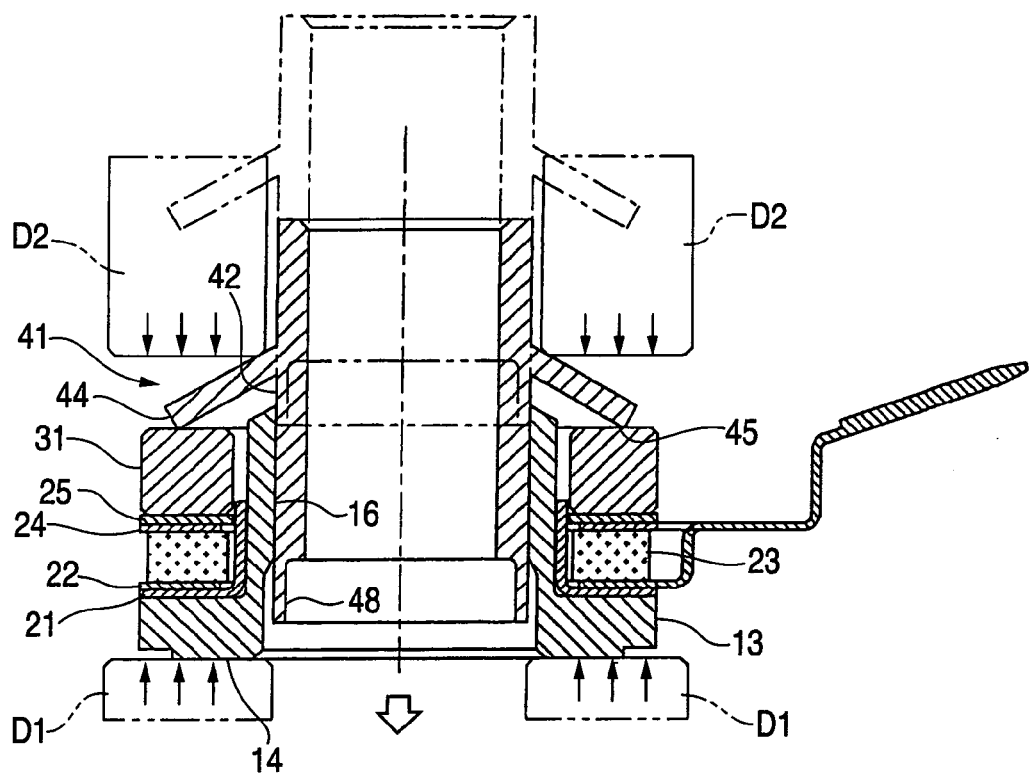
FIGS. 4A and 4B are sectional views for explaining the step of pressing in the fixing member.
Figure 4B:
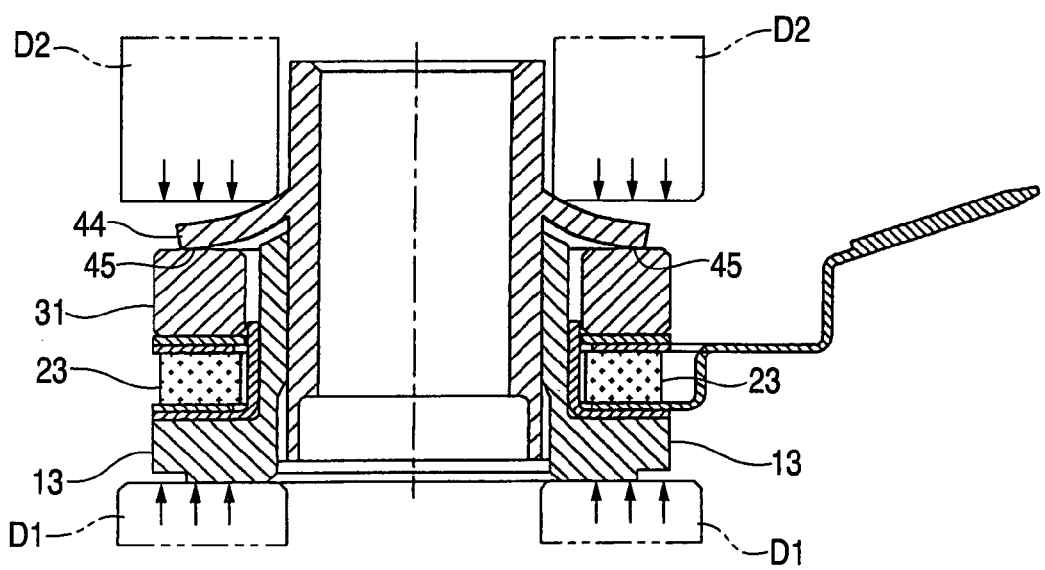

Here will be described an assembling (or manufacturing) process of the sensor 1 of the embodiment thus far described. As shown in FIG. 3, a subassembly is prepared by arranging the individual parts over the supporting flange 13 of the cylindrical body 11. The fixing member 41 is brought so far into the cylindrical portion 12 from the side of the upper end 18 that the press-in tubular portion 42 may confront the inner side of the cylindrical portion 12. After this, a press apparatus is used to support the lower face 14 of the supporting flange 13 of the cylindrical body 11 on a lower die D1, as shown in FIG. 4. In this state, an upper die D2 is pushed down to press the press-in tubular portion 42 to a predetermined stroke into the cylindrical portion 12. In this embodiment, that stroke is so predetermined that the holding portion 44 abuts at the lower face 45 of its outer circumferential portion against the upper face 32 of the weight 31, as shown in FIG. 4A, and that it is then elastically deformed, as shown in FIG. 4B, to hold the upper face 32 of the weight 31 with a predetermined holding force. This stroke is so set that the root of the holding portion 44 retains a predetermined clearance from the upper end 18 of the cylindrical portion 12, as has been described above, but may be suitably set so long as the predetermined holding force is attained.

Figure 5:
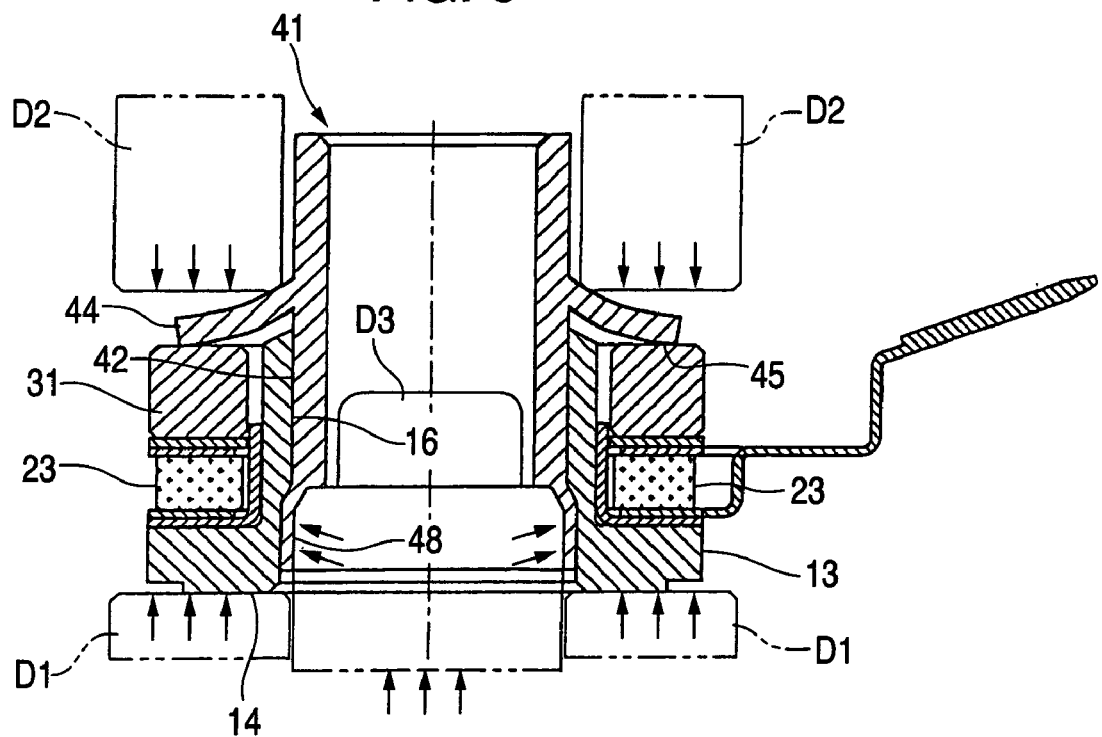

After this press-in operation, a die D3 for expanding the thin portion 48 of the inner circumference 47 of the lower end portion of the press-in tubular portion 42 is pressed into the press-in tubular portion 42 from below the fixing member 41, as shown in FIG. 5, and expands and pushes the thin portion 48 onto the diametrically enlarged portion 16a of the inner circumference 16 of the cylindrical portion 12. After this, the assembly thus prepared is inserted into a resin mold, and the insulating resin is molded to form the outer surface 51 together with the connector portion 50. Thus, there is manufactured the sensor 1, as shown in FIG. 1.

Here, the press-in allowance of the press-in tubular portion 42 of the fixing member 41 for the inner side of the cylindrical portion 12 of the cylindrical body 11 is so preferably set that the press-in tubular portion 42 neither loosens nor comes out against the elastic deformation of the holding portion 44 so that a sufficient fixing force can be attained between those two parts. The press-in allowance may be suitably set considering the materials, strengths and so on of the individual parts within a range for the smooth press-in operation. Here, this press-in operation is smoothed if at least one of the corner between the lower end portion and the outer circumference of the press-in tubular portion 42 and the corner between the upper end portion and the inner circumference of the cylindrical portion 12 is chamfered in the circumferential direction. On the other hand, the force for the holding portion 44 to hold the weight 31 is manifested by the elastic deformation of the holding portion 44. In order that the proper holding force (or the clamping load) may be applied to the piezoelectric element, therefore, the deformation of the holding portion 44 at the press-in time is designed or set according to the material of the fixing member 41. The deformation is increased, if the elasticity (or the spring properties) of the holding portion 44 is low, but is decreased if the elasticity is high. Here in this embodiment, the holding portion 44 is formed in the ring shape around the outer circumference of the press-in tubular portion 42 so that it can hold the weight 31 in the entire circumference.

Figure 6A:
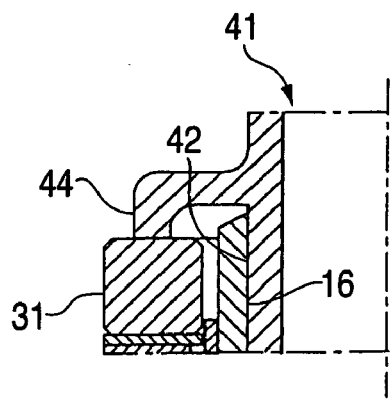
FIGS. 6A and 6B present sectional views showing another example of a holding portion of the fixing member.
Figure 6B:
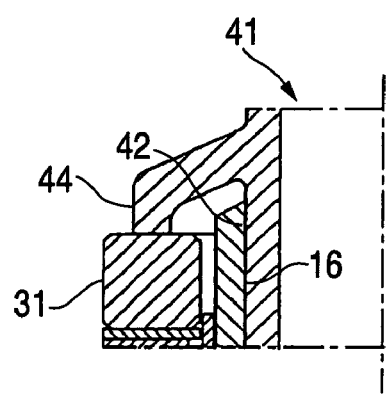

In this embodiment, moreover, the holding portion 44 is formed into the flange shape and inclined so straight that it takes the lower position as it goes the farther to the outer circumference edge, but can be shaped to have the individual sections, as shown in FIGS. 6A and 6B. It is sufficient that the holding portion 44 can hold the weight 31 elastically when the press-in tubular portion 42 is pressed and fixed in the cylindrical portion 12. Therefore, the holding portion 44 can be embodied into other suitable sectional shapes.

Here, the embodiment thus far described has been explained on the structure, in which the tubular portion 42 of the fixing member 41 is pressed and fixed in the cylindrical portion 12 of the cylindrical body 11. In the sensor of the invention, however, the tubular portion 42 need not be pressed in but may be modified such that it is fixed in the cylindrical portion 12 after inserted. One example of this modification will be described with reference to FIG. 7. However, this modification is basically common to the embodiment shown in FIG. 1. Therefore, the description will be restricted to only the different points by designating the common portions (or the corresponding portions) by the common reference numerals. Moreover, FIG. 7 corresponds to an enlarged view of FIG. 1.

Figure 7:
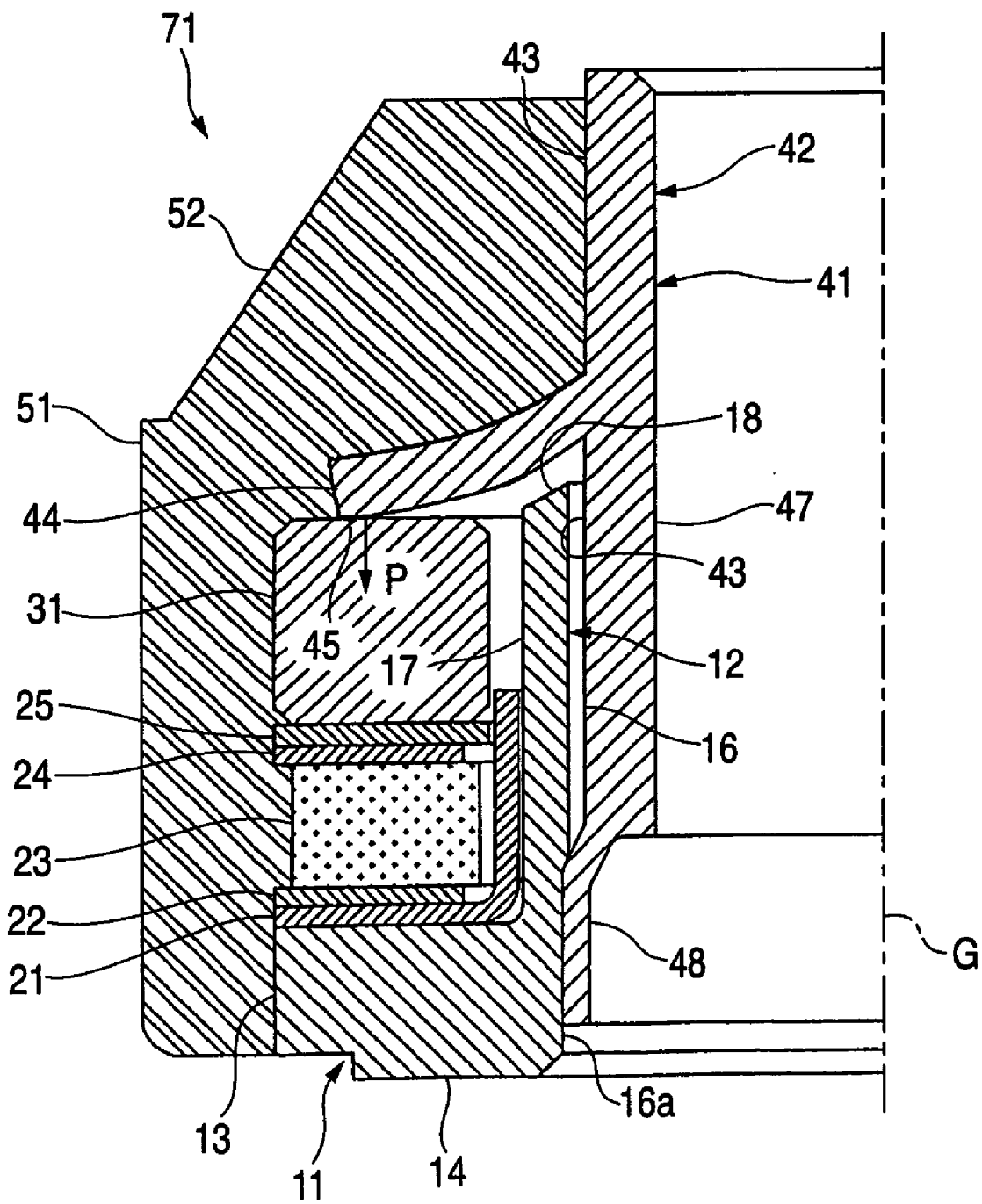
FIG. 7 is an enlarged sectional view showing an essential portion of another embodiment of the sensor of the invention.

In a sensor 71 shown in FIG. 7, before assembled, the tubular portion 42 of the fixing member 41 has an external diameter made slightly smaller than the internal diameter of the inner circumference 16 above the diametrically enlarged portion 16a of the cylindrical portion 12 of the cylindrical body 11 and given an equal diameter over its vertical entirety. Therefore, what is different from the embodiment of FIG. 1 is that the tubular portion 42 is not pressed in the cylindrical portion 12 but loosely fitted after inserted. In the assembly of the sensor 71 of this embodiment, the tubular portion 42 may be inserted into the cylindrical portion 12 by a process like that of the foregoing embodiment and then fixed in the cylindrical portion 12 by another fixing means. For the fixing means of this embodiment like that of the embodiment of FIG. 1, a die for expanding the thin portion 48 of the inner circumference 47 of the lower end portion of the tubular portion 42 of the fixing member 41 is pushed into the tubular portion 42 so that it pushes and expands the thin portion 48 onto the diametrically enlarged portion 16a of the inner circumference 16 of the cylindrical portion 12 thereby to fix the same. In this fixed state, moreover, the weight 31 is elastically held by the holding portion 44. Here, the fixing means may also be exemplified by pouring solder into the clearance between the outer circumference of the tubular portion 42 and the inner circumference of the cylindrical portion 12.

On the other hand, the sensors of the individual embodiments thus far described are embodied by the structure provided with the weight 31 as an independent part. In the state where the tubular portion 42 of the fixing member 41 is inserted and fixed in the cylindrical portion 12 of the cylindrical body 11, that the weight 31 is elastically held by the holding portion 44 so that the individual parts such as the piezoelectric element 23 are clamped and fixed between the supporting flange 13 and the weight 31. However, this independent weight 31 is not essential for the sensor of the invention, because it is sufficient for the sensor to acquire the knocking signal.

Figure 8:
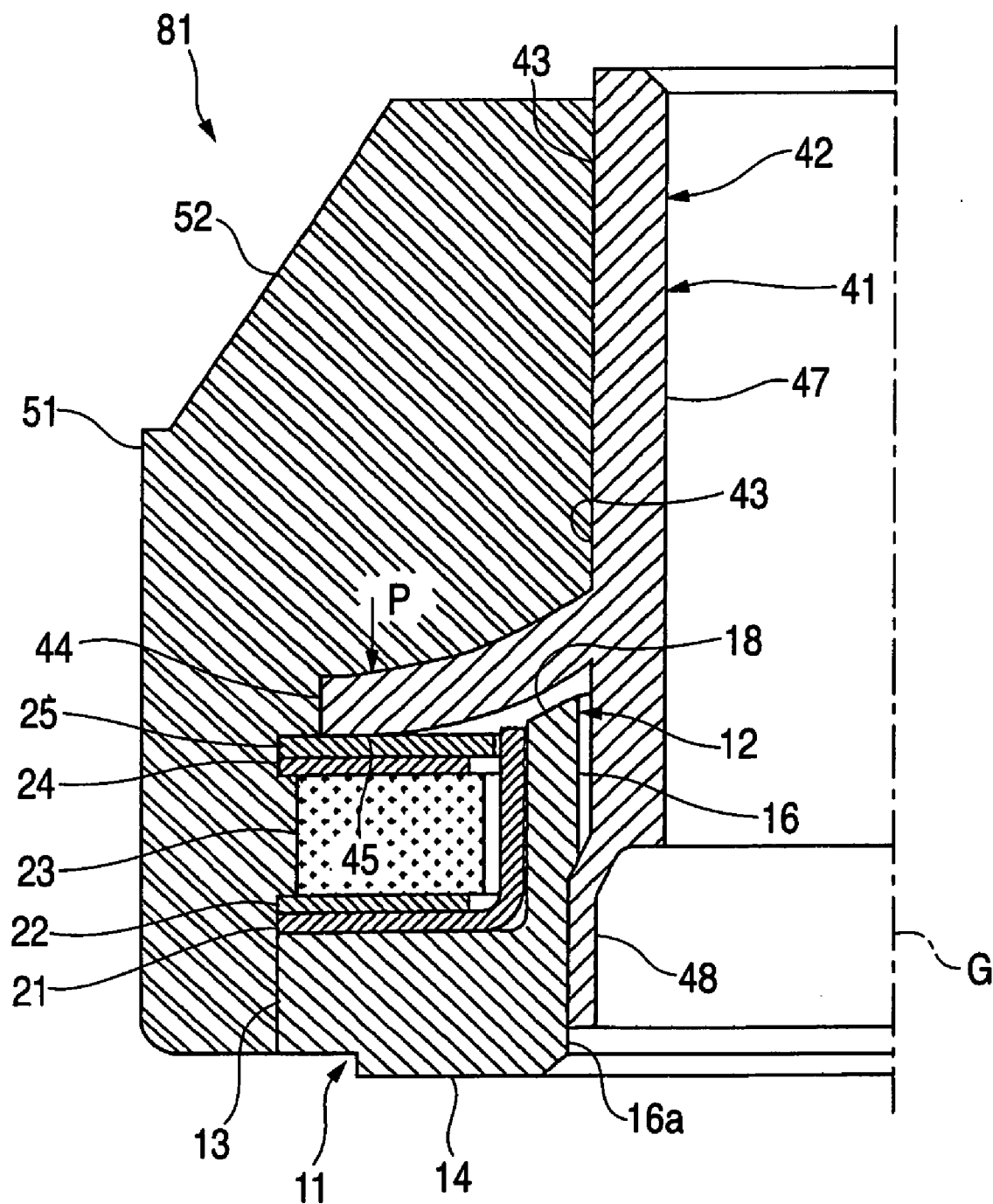
FIG. 8 is an enlarged sectional view showing an essential portion of another embodiment of the sensor of the invention.

FIG. 8 shows one example, which is substantially different only in that the weight 31 is omitted from the structure of FIG. 7. Specifically in a sensor 81 of FIG. 8, the weight 31 is omitted from the structure of FIG. 7. Moreover, the cylindrical portion 12 is lowered (or shortened), and the holding portion 44 of the tubular portion 42 is lowered to hold the individual parts such as the piezoelectric element 23 elastically. As a result, those individual parts are clamped and fixed between the supporting flange 13 and the holding portion 44. Here, the tubular portion 42 may be fixed by pressing it into the cylindrical portion 12. In FIG. 8, however, the tubular portion 42 is not pressed in but just inserted. After inserted, therefore, the fixing member 41 is fixed in the cylindrical body 11 like before by pushing the die for expanding the thin portion 48 of the inner circumference 47 of the lower end portion of the tubular portion 42 of the fixing member 41 into the tubular portion 42 from below the fixing member 41, thereby to expand and push that thin portion 48 onto the diametrically enlarged portion 16a of the inner circumference 16 of the cylindrical portion 12.

In the sensor 81 of this embodiment, the individual parts such as the piezoelectric element 23 are clamped not through the weight but by the holding portion 44 so that the number of parts and the cost for the product (i.e., the sensor) can be reduced to the extent of no weight. In this embodiment, however, the shapes, sizes, spring properties and so on of the holding portion 44 are so preferably set that the holding portion 44 can clamp the individual parts such as the piezoelectric element 23 as homogeneously as possible. This is true, but the sensor 81 of this embodiment is inferior in the performance of knocking detection to the sensor having the weight 31, as shown in FIG. 1. It is, therefore, preferred that the holding portion is formed not to act as an independent weight but to bear the action of the weight.

An embodiment of this sensor will be described with reference to FIG. 9 to FIGS. 11A to 11C. However, this sensor 102 has such a structure basically common to that of the sensor of the embodiment shown in FIG. 1 that the tubular portion 42 of the fixing member 41 is pressed in the cylindrical portion 12 of the cylindrical body 11. Therefore, the description will be suitably omitted by designating the identical or common portions (or the corresponding portions) by the identical reference numerals. Specifically in the sensor 102 of this embodiment, too, there are arranged, sequentially upward in the recited order over the supporting flange 13 of the cylindrical body 11 formed substantially like that of the foregoing embodiment: the electric insulating member 21 having an L-shaped section and an annular shape of a predetermined thickness; the one annular electrode plate 22 for signal extractions; the piezoelectric element 23 formed to have an annular shape; the other annular electrode plate 24 for signal extractions; and the insulating member 25 having an annular shape of a predetermined thickness (as referred to FIG. 10). Here, the cylindrical portion 11 of this embodiment is set to have a rather smaller height than that of the embodiment shown in FIG. 1.

Over (or on the upper face) of the upper insulating member 25, on the other hand, there is arranged the ring-shaped weight 31, which is made integral with the outer circumference of the upper end portion of the press-in tubular portion 42 forming the fixing member 41. Specifically, the fixing member 41 of this embodiment can be said to have the weight 31 formed, in addition to the holding portion 44 formed in the aforementioned sensor of the embodiment of FIG. 1, integrally with the outer circumference of the upper end portion of the press-in tubular portion 42 thereof. The fixing member 41 can also be the to have the holding portion 44 of FIG. 8 made thick to act as the weight and to have a flat face portion formed on the shown lower side thereof. In this embodiment, the fixing member 41 is pressed, like the embodiment shown in FIG. 1, into the cylindrical portion 12 of the cylindrical body 11 through its press-in tubular portion 42.

Specifically, the fixing member 41 of this embodiment is provided, on the inner side of the cylindrical portion 12 of the cylindrical body 11, with the press-in tubular portion 42, which is so formed as can be pressed into the cylindrical portion 12 from the upper end side. At the same time, the ring-shaped weight 31 is formed integrally with the outer circumference 43 of the press-in tubular portion 42. However, the ring-shaped weight 31 is formed to protrude from the outer circumference of the press-in tubular portion 42 through an elastically deformable connecting portion 49. In this embodiment, moreover, the weight 31 has its lower face 35 formed into a ring-shaped flat face and its outer circumference 36 formed into a cylindrical face, and is integrated with the fixing member 41 through the connecting portion 49 extending obliquely downward from the outer circumference of the press-in tubular portion 42. Moreover, the connecting portion 49 has its lower face recessed into a conical shape, as viewed in section, so that it is so slightly thinned as can be elastically deformed.

Figure 11A:
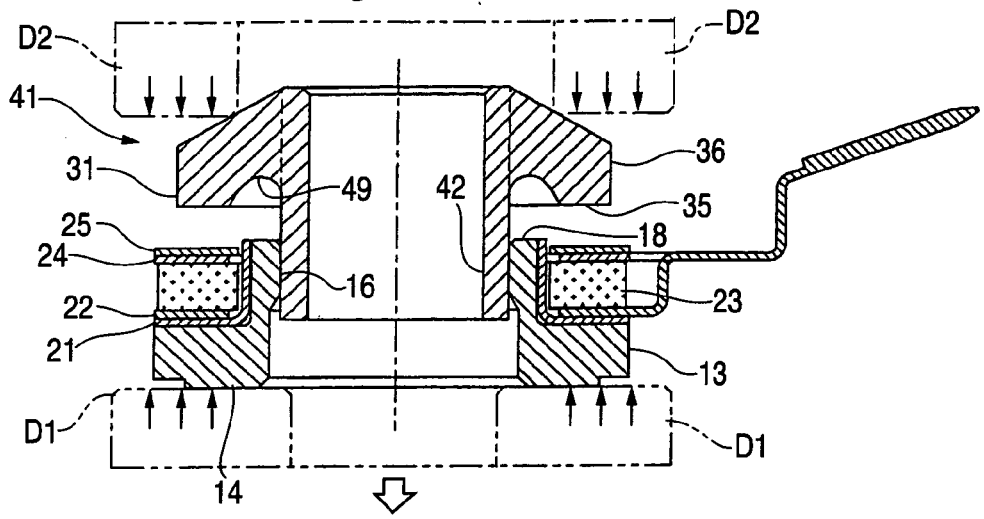
FIGS. 11A to 11C present sectional views for explaining a press-in step and a subsequent caulking step of the fixing member.
Figure 11B:
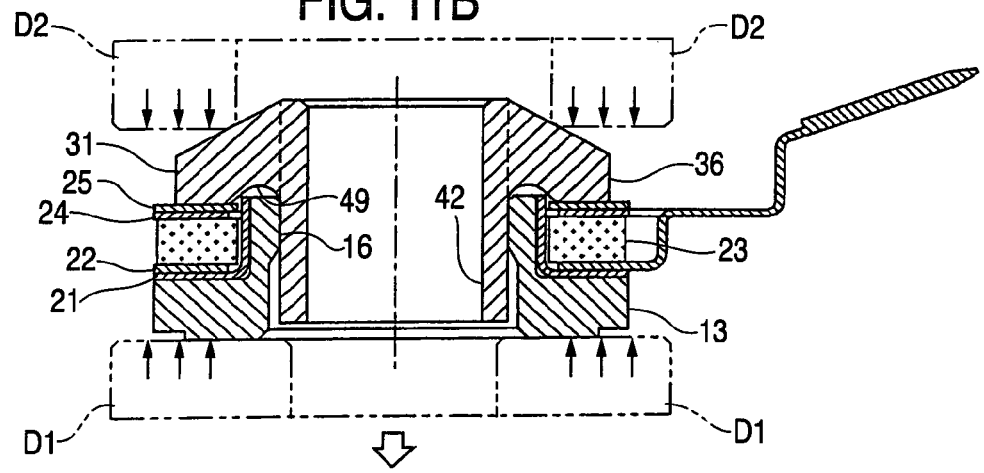

In this embodiment, as shown in FIGS. 11A and 11B, the press-in tubular portion 42 of the fixing member 41 is pressed in from the upper end 18 of the cylindrical portion 12 of the cylindrical body 11 and is fixed in that cylindrical portion 12. In this fixed state after the press-in operation, moreover, the weight 31 is so partially deformed elastically upward, as compared before pressed in, through the connecting portion 49 forming the root of the weight 31 that its lower face 35 may hold the overlying insulating member 25 with a predetermined pressure. Thus in this embodiment, the connecting portion 49 performs the role of the holding portion of the foregoing embodiment, and clamps the individual parts including the piezoelectric element 23, under a predetermined load at the portion of the weight 31.

Figure 9:
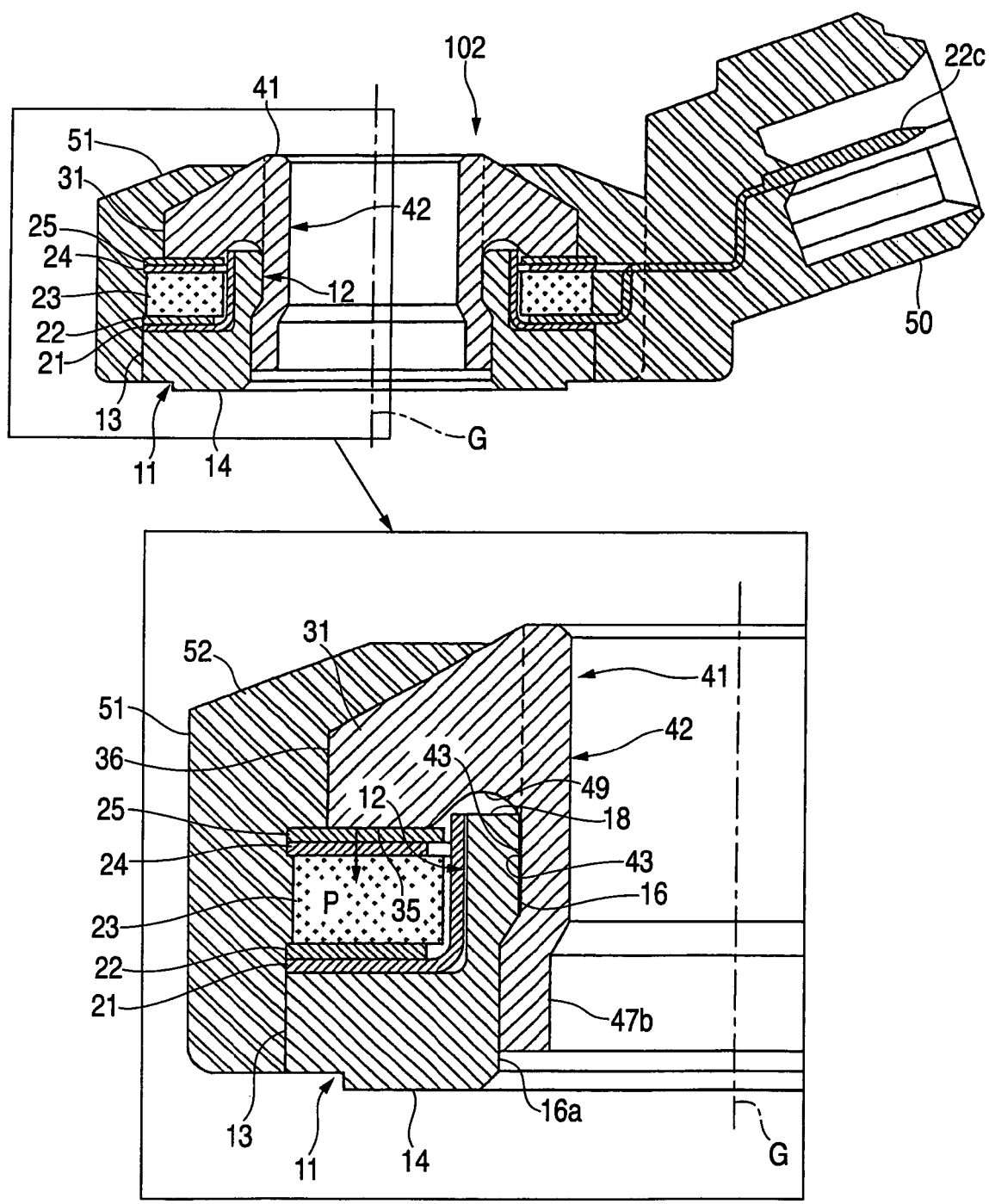
FIG. 9 presents a sectional front elevation and an enlarged view showing another embodiment of the sensor of the invention.
Figure 10:
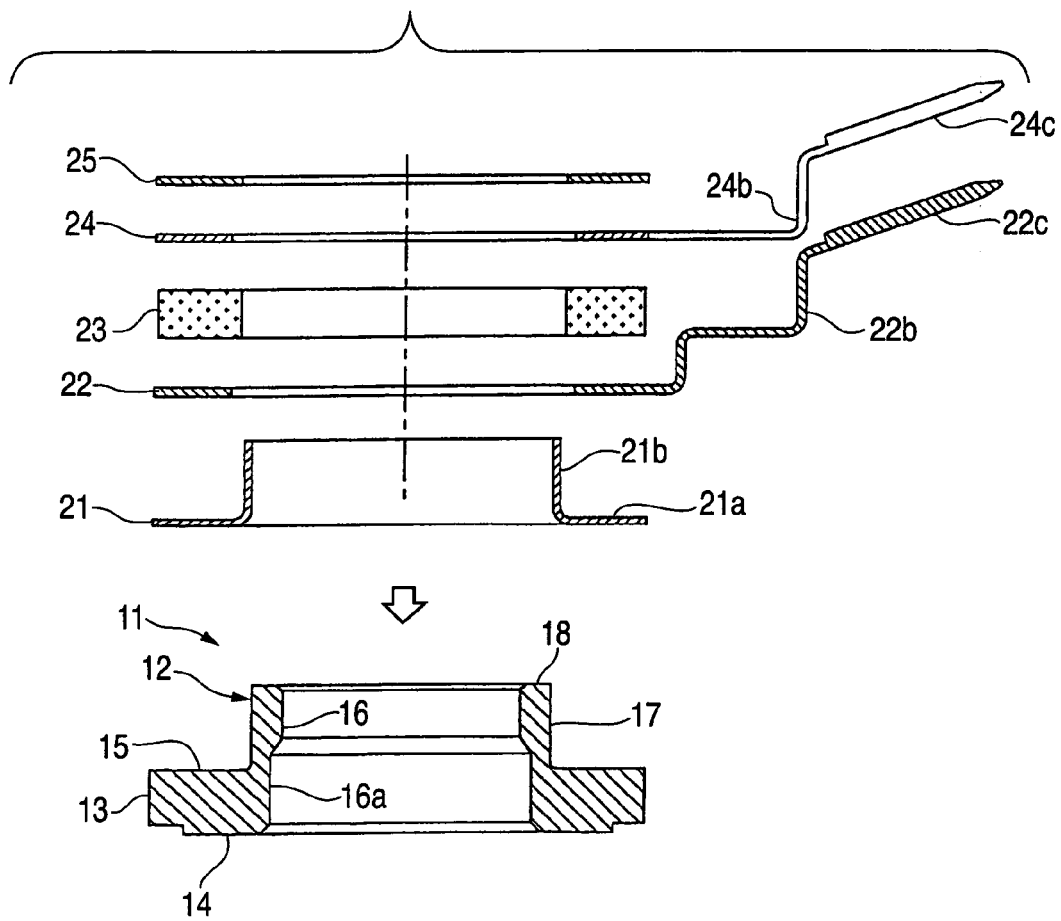
FIG. 10 is an exploded sectional view for explaining the individual parts excepting the fixing member.
Figure 11C:
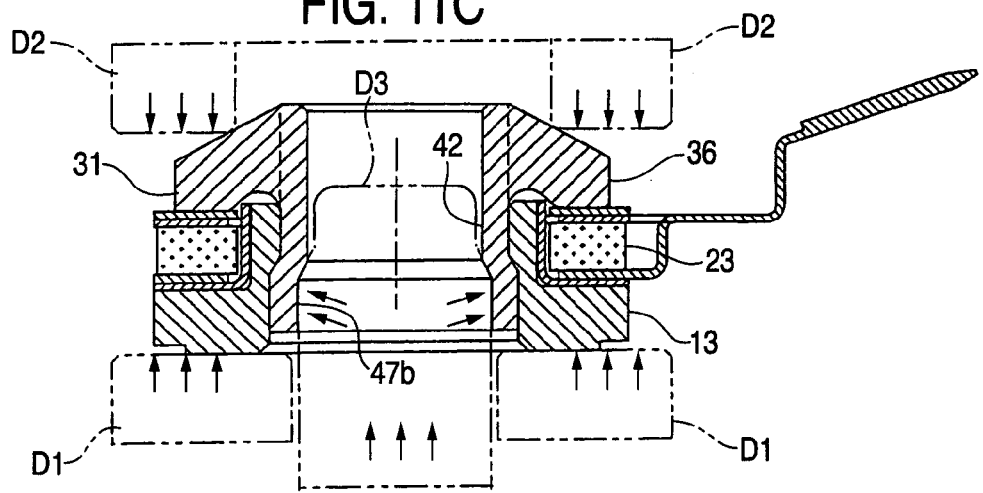

In this press-in tubular portion 42 of this embodiment, too, a lower end portion 47b (lower end portion) of the inner circumference is so caulked after pressed in as to bulge, as shown in FIG. 11C, so that it is pushed onto the diametrically enlarged portion 16a of the inner circumference 16 of the cylindrical portion 12 of the cylindrical body 11 (as referred to FIG. 9). This retains not only the high fixing force but also the high sealing properties. In this embodiment, however, the press-in tubular portion 42 is made so straight, before pressed in, as to have equal internal and diameters excepting the weight 31 and the connecting portion 49. Like the embodiment of FIG. 1, moreover, the insulating resin 52 is molded on the outer surface 51 to form the obliquely upward connector portion 50 while covering the individual parts as a whole.

In the sensor 102 of this embodiment thus constructed, it can be said that the weight 31 is integrated with the holding portion 44 in the press-in tubular portion 42 of the sensor of the foregoing embodiment shown in FIG. 1. Therefore, this embodiment can achieve effects similar to those of the foregoing embodiment. In addition, this embodiment does not need any independent weight but can accordingly reduce the number of parts so that it can expect the lower cost.

Here, the connecting portion 49 may be made to have such suitable sectional shape and thickness that it can establish a proper holding force by an elastic deformation after pressed in. In this embodiment, the connecting portion 49 is made slightly thinner than the portion of the weight. In case, however, a predetermined holding force is to be retained by a more elastic deformation, the connecting portion 49 may be designed for easier deflection by thinning its portion leading to the weight 31 in the sectional view or by forming a notch, as shown in FIG. 12. Alternatively, the connecting portion need not be made especially thin so long as it can retain the predetermined holding force by the elastic deformation. Thus, the connecting portion may be so suitably designed according to its material, shape and so on as to establish the proper holding force.

In any modification, when the weight 31 formed in the fixing member 41 holds the insulating member 25 after the press-in operation, i.e., when the connecting portion is elastically deformed, it is preferred that the piezoelectric element 23 can be properly held so that the lower face 35 of the portion of the weight 31 confronting the upper face of the piezoelectric element 23 may be parallel to that upper face.

Figure 13:
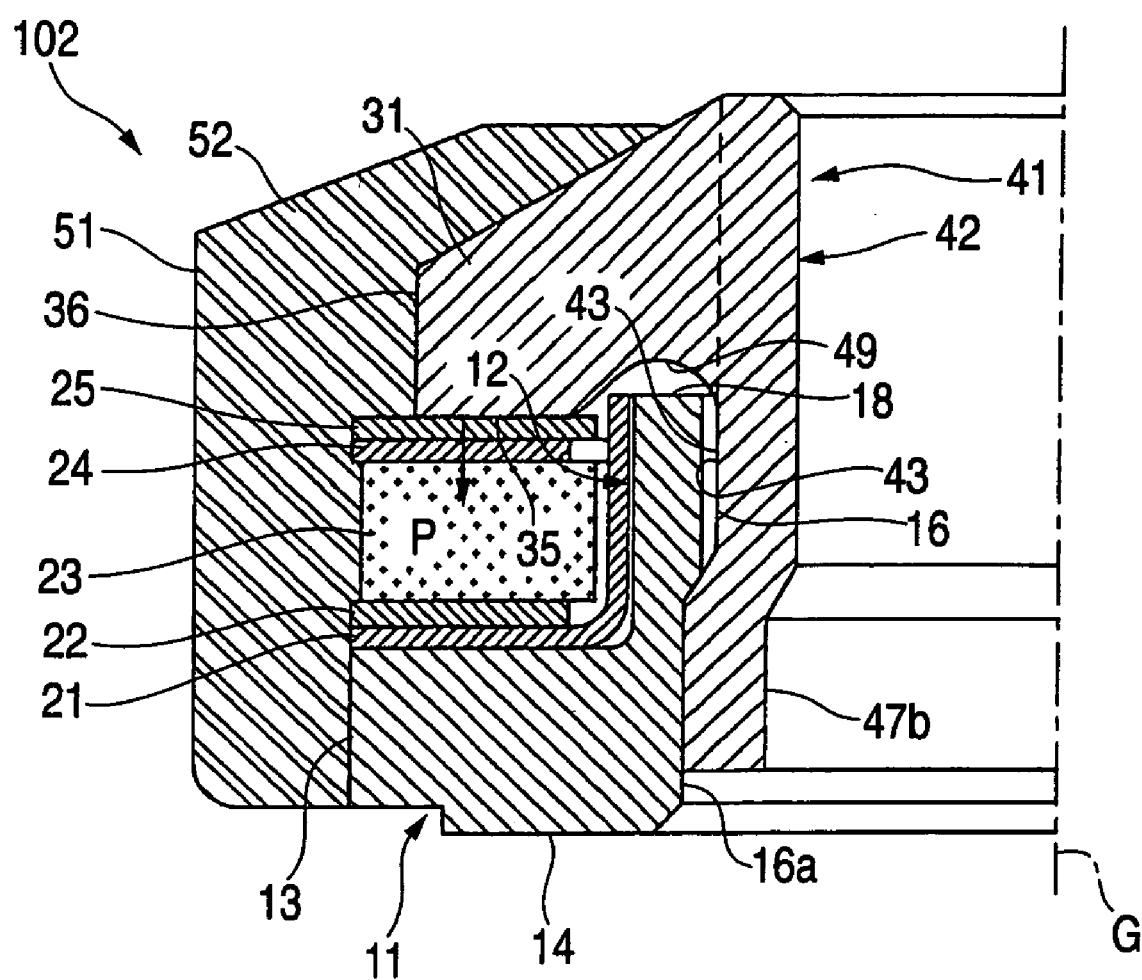
FIG. 13 is an enlarged sectional view showing an essential portion of an embodiment of an insertion resorting not to the press-in operation in FIG. 9.

In the sensor 102 of this embodiment, too, the tubular portion 42 may be not pressed in but inserted and set in the cylindrical portion 12, as shown in FIG. 13. In this case, the fixing member 41 may be fixed in the cylindrical body 11 after the tubular portion 42 was inserted, like before by expanding (or caulking) the lower end portion 47b to press it on to the diametrically enlarged portion 16a of the inner circumference 16 of the cylindrical portion 12.

Figure 14:
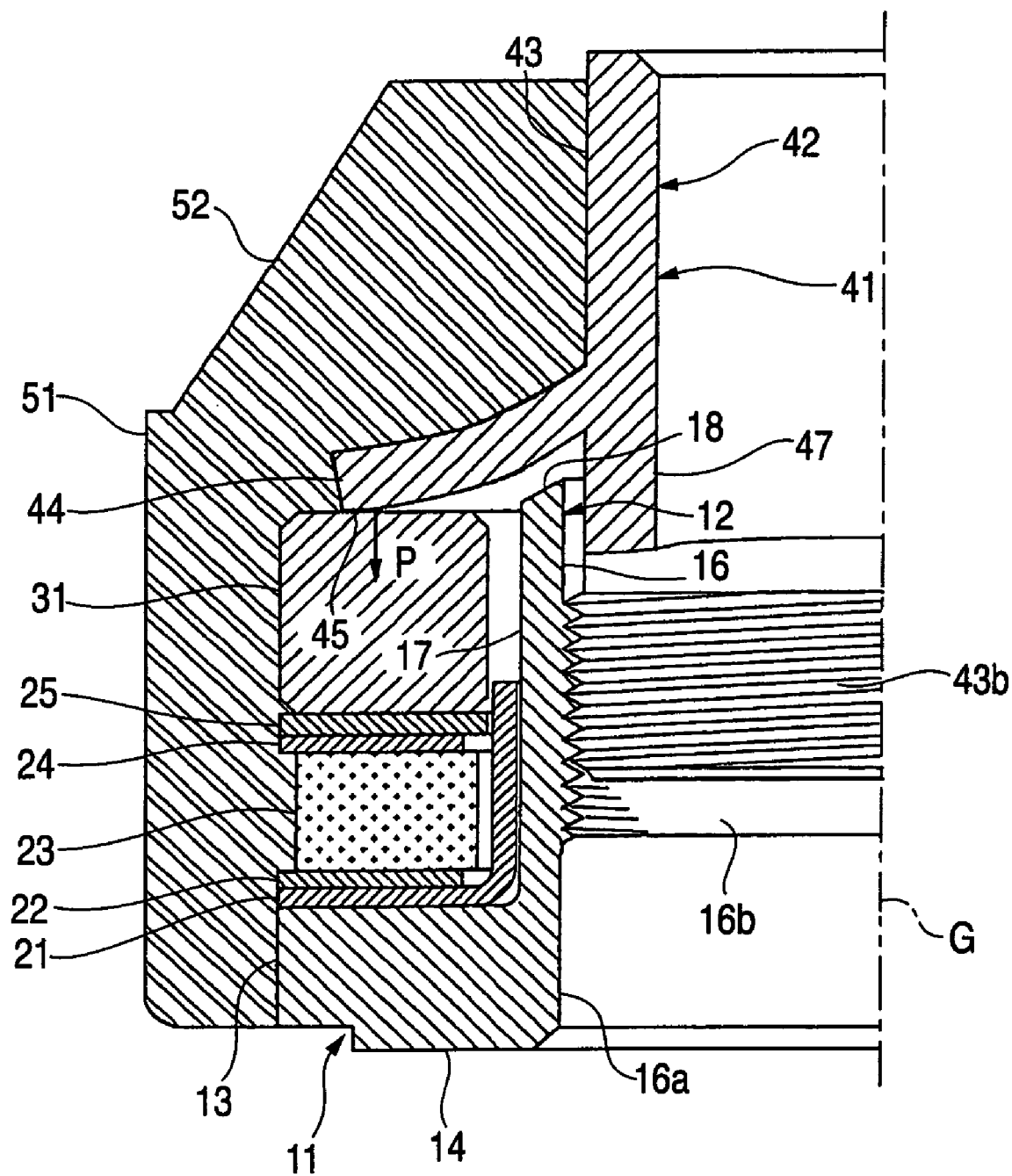
FIG. 14 is an enlarged sectional view showing an essential portion of another embodiment of the sensor of the invention.

In any of the sensors of the individual embodiments thus far described, the fixing member 41 is fixed in the cylindrical body 11 by pressing the tubular portion 42 of the fixing member 41 into the cylindrical portion 12 of the cylindrical body 11. However, the sensor of the invention need not adopt such insertion but may resort to a screw type, as exemplified in FIG. 14. In the embodiment of FIG. 1, according to the example of FIG. 14, an (external) thread 43b is formed in the outer circumference 43 of the lower portion of the tubular portion 42 of the fixing member 41, and an (internal) thread 16b is formed in the portion of the inner side (i.e., the inner circumference 16) of the cylindrical portion 12 to be fitted on the former. Then, the tubular portion 42 may be screwed and fastened downward in the cylindrical portion 12 thereby to hold via the weight 31 the individual parts such as the piezoelectric element through the holding portion 44. Here, the sensor of this screw type can also be embodied without the weight.

The invention should not be limited to those embodiments thus far described but can be embodied by changing its design suitably within the scope undeparting from its gist. The individual embodiments are embodied by the connector portion, which protrudes obliquely upward. It goes, however, without saying that the invention can be embodied by any protruding direction. Moreover, the embodiments are embodied by the structure, in which the piezoelectric element is sandwiched between the two upper and lower electrode plates. However, the invention can also be embodied by using a piezoelectric element having two electrodes on one side.

In the aforementioned knocking sensor according to the first or second aspect of the invention, the parts such as the piezoelectric element are fixed by inserting the fixing member having the tubular portion so formed as to be inserted into the cylindrical portion from the upper end of the same, by inserting the tubular portion of the fixing member into the cylindrical portion from the upper end of the same. The knocking sensor according to the first or second aspect of the invention is freed from the short-circuiting drawback, which raises the problems in such an aforementioned case of the prior art described in JP-A-2002-257624 that the parts such as the piezoelectric element are fixed by screwing the nut into the thread in the outer circumference of the cylindrical portion or in such an aforementioned case of the prior art described in JP-A-11-173907 that the weight is pressed in along the inner circumference wall of the case for housing and arranging the piezoelectric element. Therefore, the knocking sensor is effective for preventing the failures, which might otherwise be caused by such drawback. Specifically, in the invention, the tubular portion is inserted into the cylindrical portion of the cylindrical body on the side opposed to the side, on which the piezoelectric element is housed. Even if, therefore, the fine metal chips are generated by the friction or the like in the inserting procedure, the are kept away from contact with the piezoelectric element or the like. Thus, the invention can prevent the short-circuiting drawback and has a special effect to provide a highly reliable sensor.

Moreover, the knocking sensor of the invention is sufficient if the piezoelectric element generates a voltage signal according to the knocking vibration when a vibrating load according to the knocking vibration is applied to the piezoelectric element. Without providing the weight like the description of the first aspect of the invention, the parts may be clamped and fixed between the supporting flange and the holding portion by holding them elastically in the fixing state of the fixing member by the holding portion. In order to enhance the detecting performance of a knocking, however, it is preferred that the parts such as the piezoelectric element are elastically held by the holding portion through the weight as in the knocking sensor of the second aspect of the invention.

Here, the knocking sensor according to the first or second aspect of the invention is made to have the structure, in which the tubular portion is fixed by inserting it into the cylindrical portion from the upper end of the same. This fixing (means) may weld or sold the outer circumference of the lower end portion of the tubular portion to the inner circumference of the cylindrical portion. Like the knocking sensor of the third aspect of the invention, however, the caulking means is preferred because it simplifies the sensor assembling procedure. However, the separate fixing means can be dispensed with, in case the external diameter of the tubular portion is larger than the internal diameter of the cylindrical portion so that not the clearance fit but the interference fit is used after the insertion and can retain a sufficient fixture with the fitting itself. This case is exemplified by the press-in insertion. Specifically, the knocking sensor of the fourth aspect of the invention need not have the aforementioned separate fixing means, because the insertion of the tubular portion into the cylindrical portion of the knocking sensor is performed by the structure in which the tubular portion is pressed into the cylindrical portion.

Thus, the invention has a special effect to provide a highly reliable sensor at a low cost.

In the fourth aspect of the invention, according to the sensor of fifth aspect of the invention, the parts are held through the weight so that the performance to detect the knocking can be enhanced as in the case of the second aspect of the invention. As defined in the sixth aspect of the invention, moreover, the performance is stabilized by forming the holding portion into the ring shape.

Especially the knocking sensor according to any of the eighth to tenth aspects of the invention is provided with the weight but does not need any independent weight as one of the parts. This absence of the weight does not invite any increase in the number of parts or any complicated structure so that the knocking detecting performance can be enhanced.

According to the sensor of the eleventh aspect of the invention, on the other hand, the tubular portion is pressed in. In addition, the portion close to the leading end of the pressed-in tubular portion is caulked to a larger diameter and is pushed onto the inner circumference of the diametrically enlarged portion so that the fixing member (or the tubular portion) can be reliably prevented from coming out. With this caulking deformation, a high sealing performance (against a liquid) is obtained for the piezoelectric element. This results in an effect for a higher reliability.

This is true, but the tubular portion may be not pressed in but inserted into the cylindrical portion, as in the sensor of the seventh aspect of the invention. In this case, too, the outer circumference of the lower end portion of the tubular portion may be welded or soldered to the inner circumference of the cylindrical portion in case the tubular portion inserted into the cylindrical portion is to be fixed. However, the tubular portion may be fixed by caulking it as in the knocking sensor of the twelfth aspect of the invention.

Here in the invention, the screwing method is adopted by the sensor of the thirteenth aspect of the invention, but the tubular portion is fixed in the cylindrical portion by the screwing manner. Therefore, the fine metal chips, if generated in the screwing procedure by the friction of the screw, can be prevented from contacting with the piezoelectric element or the like. Thus according to the invention, the drawback such as the short-circuiting due to the fine metal chips can be prevented from occurring, so that the sensor can be given a high reliability.

The entire disclosure of each and every foreign patent application from which the benefit of foreign priority has been claimed in the present application is incorporated herein by reference, as if fully set forth.

What is claimed is:

1. A knocking sensor comprising:
   a cylindrical body including a cylindrical portion and a supporting flange, the supporting flange being provided at an outer circumference of a lower end of the cylindrical portion;
   parts including an insulating member, an electrode plate and an annular piezoelectric element arranged and fixed on the supporting flange; and
   a fixing member including a tubular portion which comprises a holding portion protruding from an outer circumference of the tubular portion and is formed to insert into the cylindrical portion from an upper end of the cylindrical portion, the holding portion being elastically deformable to hold the parts,
   wherein the fixing member is fixed in the cylindrical portion by inserting the tubular portion of the fixing member into the cylindrical portion from the upper end of the cylindrical portion, and
   wherein the parts are clamped and fixed between the supporting flange and the holding portion by holding the parts elastically with the holding portion, while the fixing member is fixed in the cylindrical portion.

2. A knocking sensor according to claim 1,
   wherein the cylindrical portion comprises a diametrically enlarged portion at such a portion of its inner circumference as corresponds to a lower end portion of the tubular portion at the time when the tubular portion is inserted, and
   wherein the lower end portion of the tubular portion inserted is caulked and deformed to a diametrically larger shape and pushed onto an inner circumference of the diametrically enlarged portion, so as to fix the tubular portion in the cylindrical portion.

3. A knocking sensor according to claim 1, wherein the tubular portion is formed to press into the cylindrical portion, and the fixing member is fixed by pressing its tubular portion into the cylindrical portion from the upper end of the cylindrical portion.

4. A knocking sensor according to claim 3,
   wherein the cylindrical portion comprises a diametrically enlarged portion at such a portion of its inner circumference as corresponds to a lower end portion of the tubular portion at the time when the tubular portion is pressed in, and
   wherein the lower end portion of the pressed-in tubular portion is caulked and deformed to a diametrically larger shape and pushed onto an inner circumference of the diametrically enlarged portion.

5. A knocking sensor according to claim 1, wherein the holding portion is formed into a ring shape at the outer circumference of the tubular portion.

6. A knocking sensor according to claim 1, wherein the fixing member comprises a thread in the outer circumference of the tubular portion, so as to fasten the fixing member into the cylindrical portion in a screw type manner.

7. A knocking sensor according to claim 1, wherein the holding portion is elastically deformed.

8. A knocking sensor according to claim 1, wherein the cylindrical portion of the cylindrical body is arranged outside of the tubular portion of the fixing member.

9. A knocking sensor comprising:
a cylindrical body including a cylindrical portion and a supporting flange, the supporting flange being provided at an outer circumference of a lower end of the cylindrical portion;
parts including an insulating member, an electrode plate and an annular piezoelectric element arranged and fixed on the supporting flange;
a weight arranged on the parts; and
a fixing member including a tubular portion which is formed to insert into the cylindrical portion from an upper end of the cylindrical portion,
wherein the weight is formed to protrude through an elastically deformable connecting portion from an outer circumference of the tubular portion,
wherein the fixing member is fixed in the cylindrical portion by inserting the tubular portion of the fixing member into the cylindrical portion from the upper end of the cylindrical portion, and
wherein the parts are clamped and fixed between the supporting flange and the weight by holding the parts elastically with a portion of the weight, while the fixing member is fixed in the cylindrical portion.

10. A knocking sensor according to claim 9,
wherein the tubular portion is formed to press into the cylindrical portion from the upper end of the cylindrical portion, and
wherein the fixing member is fixed by pressing the tubular portion of the fixing member into the cylindrical portion from the upper end of the cylindrical portion.

11. A knocking sensor according to claim 10,
wherein the cylindrical portion comprises a diametrically enlarged portion at such a portion of its inner circumference as corresponds to an lower end portion of the tubular portion at the time when the tubular portion is pressed in, and
wherein the lower end portion of the pressed-in tubular portion is caulked and deformed to a diametrically larger shape and pushed onto an inner circumference of the diametrically enlarged portion.

12. A knocking sensor according to claim 9, wherein the portion of the weight is formed into a ring shape at the outer circumference of the tubular portion.

13. A knocking sensor according to claim 9, wherein the elastically deformable connecting portion is made thinner than the portion of the weight.

14. A knocking sensor according to claim 9,
wherein the cylindrical portion comprises a diametrically enlarged portion at such a portion of its inner circumference as corresponds to an lower end portion of the tubular portion at the time when the tubular portion is inserted, and
wherein the lower end portion of the tubular portion inserted is caulked and deformed to a diametrically larger shape and pushed onto an inner circumference of the diametrically enlarged portion, so as to fix the tubular portion in the cylindrical portion.

15. A knocking sensor according to claim 9, wherein the fixing member comprises a thread in the outer circumference of the tubular portion, so as to fasten the fixing member into the cylindrical portion in a screw type manner.

16. A knocking sensor comprising:
a cylindrical body including a cylindrical portion and a supporting flange, the supporting flange being provided at an outer circumference of a lower end of the cylindrical portion;
parts including an insulating member, an electrode plate and an annular piezoelectric element arranged and fixed on the supporting flange;
a weight arranged on the parts; and
a fixing member including a tubular portion which comprises a holding portion protruding from an outer circumference of the tubular portion and is formed to insert into the cylindrical portion from an upper end of the cylindrical portion, the holding portion being elastically deformable to hold the weight,
wherein the fixing member is fixed in the cylindrical portion by inserting the tubular portion of the fixing member into the cylindrical portion from the upper end of the cylindrical portion, and
wherein the parts are clamped and fixed between the supporting flange and the weight by holding the weight elastically with the holding portion, while the fixing member is fixed in the cylindrical portion.

17. A knocking sensor according to claim 16,
wherein the cylindrical portion comprises a diametrically enlarged portion at such a portion of its inner circumference as corresponds to a lower end portion of the tubular portion at the time when the tubular portion is inserted, and
wherein the lower end portion of the tubular portion inserted is caulked and deformed to a diametrically larger shape and pushed onto an inner circumference of the diametrically enlarged portion, so as to fix the tubular portion in the cylindrical portion.

18. A knocking sensor according to claim 16, wherein the tubular portion is formed to press into the cylindrical portion, and the fixing member is fixed by pressing its tubular portion into the cylindrical portion from the upper end of the cylindrical portion.

19. A knocking sensor according to claim 18,
wherein the cylindrical portion comprises a diametrically enlarged portion at such a portion of its inner circumference as corresponds to an lower end portion of the tubular portion at the time when the tubular portion is pressed in, and
wherein the lower end portion of the pressed-in tubular portion is caulked and deformed to a diametrically larger shape and pushed onto an inner circumference of the diametrically enlarged portion.

20. A knocking sensor according to claim 16, wherein the holding portion is formed into a ring shape at the outer circumference of the tubular portion.

21. A knocking sensor according to claim 16, wherein the fixing member comprises a thread in the outer circumference of the tubular portion, so as to fasten the fixing member into the cylindrical portion by a screwing manner.

22. A knocking sensor comprising:
a sensor body including a hollow portion and a supporting flange extending from the hollow portion;
an insulating member, an electrode plate and an annular piezoelectric element arranged on the supporting flange; and a fixing member comprising a body portion and a holding portion;

wherein the body portion of the fixing member is arranged inside the hollow portion of the sensor body; and wherein the holding portion extends from the body portion of the fixing member to hold the insulating member, the electrode plate and the annular piezoelectric element between the holding portion and the supporting flange.

23. A knocking sensor according to claim 22, wherein the holding portion is elastically deformed.

* * * * *